(12) United States Patent
Tan et al.

(10) Patent No.: US 11,528,064 B2
(45) Date of Patent: Dec. 13, 2022

(54) DETERMINATION OF SUB-BAND ALLOCATION PARAMETERS FOR WIRELESS NETWORKS

(71) Applicant: NOKIA TECHNOLOGIES OY, Espoo (FI)

(72) Inventors: Jun Tan, Lake Zurich, IL (US); Nitin Mangalvedhe, Hoffman Estates, IL (US); Frederick Vook, Schaumburg, IL (US); William Hillery, Lafayette, IN (US); Eugene Visotsky, Buffalo Grove, IL (US)

(73) Assignee: Nokia Technologies Oy, Espoo (FI)

( * ) Notice: Subject to any disclaimer, the term of this patent is extended or adjusted under 35 U.S.C. 154(b) by 433 days.

(21) Appl. No.: 16/616,900

(22) PCT Filed: Jun. 13, 2018

(86) PCT No.: PCT/EP2018/065633
§ 371 (c)(1),
(2) Date: Nov. 25, 2019

(87) PCT Pub. No.: WO2018/229112
PCT Pub. Date: Dec. 20, 2018

(65) Prior Publication Data
US 2020/0228169 A1 Jul. 16, 2020

Related U.S. Application Data

(63) Continuation of application No. 15/625,512, filed on Jun. 16, 2017, now abandoned.

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0617* (2013.01); *H04B 7/0639* (2013.01);
(Continued)

(58) Field of Classification Search
CPC combination set(s) only.
See application file for complete search history.

(56) References Cited

U.S. PATENT DOCUMENTS 8,903,328 B2 * 12/2014 Ko ..................... H04W 72/0413
370/252
9,055,576 B2 * 6/2015 Chen .................. H04W 72/042
(Continued)

OTHER PUBLICATIONS

International Search Report and Written Opinion for International Application No. PCT/EP2018/065633, dated Sep. 26, 2018, 15 pages.
(Continued)

*Primary Examiner* — Dady Chery
(74) *Attorney, Agent, or Firm* — Brake Hughes Bellermann LLP

(57) ABSTRACT

A technique includes receiving an uplink grant that indicates a size (M) of uplink resources allocated to the user device sub-band precoder indications; determining a set of uplink sub-band allocation parameters, including at least: a total number of bits (N) for sub-band precoder indications (where N remains constant for different values of M); a number of bits (m) per each of the sub-band precoder indications; and a sub-band size (J) for each of the one or more sub-bands; wherein at least one of the number of bits (m) per sub-band precoder indication and the sub-band size (J) for each of the one or more sub-bands changes or is a different value based on different sizes (M) of uplink resources; decoding each of the one or more sub-band precoder indications; and precoding, based on the one or more sub-band precoder indications, data for transmission via the one or more sub-bands.

18 Claims, 7 Drawing Sheets

(51) Int. Cl.
*H04W 16/14* (2009.01)
*H04W 72/04* (2009.01)
*H04W 48/12* (2009.01)
*H04W 72/14* (2009.01)
*H04W 24/10* (2009.01)
*H04W 72/08* (2009.01)

(52) U.S. Cl.
CPC ....... *H04W 16/14* (2013.01); *H04W 72/0413* (2013.01); *H04W 24/10* (2013.01); *H04W 48/12* (2013.01); *H04W 72/0453* (2013.01); *H04W 72/085* (2013.01); *H04W 72/14* (2013.01)

(56) References Cited

U.S. PATENT DOCUMENTS

| | | | | |
|---|---|---|---|---|
| 9,497,006 | B2* | 11/2016 | Chung | H04L 5/0053 |
| 9,577,813 | B2* | 2/2017 | Karjalainen | H04W 72/12 |
| 9,590,749 | B2* | 3/2017 | Chen | H04B 7/063 |
| 2015/0078284 | A1* | 3/2015 | Lee | H04L 1/0026 370/329 |
| 2016/0249250 | A1* | 8/2016 | Kim | H04L 5/00 |
| 2018/0352571 | A1* | 12/2018 | Wang | H04W 72/14 |
| 2020/0053764 | A1* | 2/2020 | Kim | H04B 7/0486 |

OTHER PUBLICATIONS

3GPP TSG RAN WG1 89; R1-1707944; "UL Codebook-Based Transmission"; Hangzhou, China; May 15-19, 2017; 9 pages.
3GPP TSG RAN WG1 Meeting #89; R1-1707600; "Discussion on Codebook Based Transmission for UL" Hangzhou, China; May 15-19, 2017; 6 pages.
3GPP TSG RAN WG1 Meeting #89; R1-1707470; Further Discussion on Codebook Based UL Transmission; Hangzhou, China May 15-19, 2017; 2 pages.
3GPP TSG RAN WG1 Meeting #89, R1-1708130; "Codebook Based Transmission for UL MIMO"; Hangzhou, China; May 15-19, 2017; 9 pages.
3GPP TSG RAN WG1 Meeting #86; R1-168173; "WF on Frequency Selective Precoding for NR UL MIMO" Gothenburg, Sweden; Aug. 22-26, 2016; 3 pages.
Non Final Office Action for U.S. Appl. No. 15/625,512, dated Aug. 9, 2018, 10 pages.
Office Action for European Application No. 18731085.9, dated Mar. 15, 2022, 5 pages.

* cited by examiner

DETERMINATION OF SUB-BAND ALLOCATION PARAMETERS FOR WIRELESS NETWORKS

CROSS-REFERENCE TO RELATED APPLICATIONS

This application is a national stage entry of International Application No. PCT/EP2018/065633, filed Jun. 13, 2018, entitled "Determination of Sub-Band Allocation Parameters For Wireless Networks" which claims priority to U.S. patent application Ser. No. 15/625,512, filed on Jun. 16, 2017, entitled "Determination of Sub-Band Allocation Parameters For Wireless Networks", the disclosures of which are incorporated by reference herein in its their entireties.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, above 6 GHz. For fifth generation wireless systems (5G), an access architecture for deployment of cellular radio equipment employing mmWave radio spectrum has been proposed. Other example spectrums may also be used, such as cmWave radio spectrum (3-30 GHz).

MIMO (multiple input, multiple output) is an antenna technology for wireless communications in which multiple antennas are used at both the source (transmitter) and the destination (receiver) in order to reduce errors and/or improve data speed. Beamforming or spatial filtering is a signal processing technique used in arrays for directional signal transmission or reception. This may be achieved by combining elements in a phased array in such a way that signals at particular angles experience constructive interference while others experience destructive interference. Beamforming can be used at both the transmitting and receiving ends in order to achieve spatial selectivity. For example, a complex antenna weight (including amplitude and phase) may be applied to each antenna to perform beamforming. A direction and width of a beam may be controlled based on the amplitude and phase of a set of antenna weights applied to set of antennas.

Also, a user device (or a user equipment/UE) may determine and report channel state information (CSI) to a base station (BS). The BS may use the CSI for scheduling or transmission of data to the UE and/or for the allocation of uplink resources for the UE. The CSI provided by a UE to a BS may include, for example, one or more of a channel quality indicator (CQI), which may be or may include a quantized signal-to-interference plus noise ratio (SINR) and which may represent a highest recommended modulation and coding scheme for downlink transmission, a rank indication (RI), which may be a recommended transmission rank or number of layers that should be used for downlink transmission, and a precoding matrix index (PMI) (or a precoder indication) that indicates a recommended precoder or precoding matrix to be used for precoding for transmission.

In some cases, precoding may be considered a generalization of beamforming to support multi-stream (or multi-layer) transmission in multi-antenna wireless communications. In conventional single-stream beamforming, the same signal is emitted from each of the transmit antennas with appropriate weighting (phase and gain) such that the signal power is improved or maximized at the receiver output.

SUMMARY

According to an example implementation, a method may include receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determining a set of uplink sub-band allocation parameters, including at least: a total number of bits (N) in the downlink control information for the one or more sub-band precoder indications, wherein the total number of bits (N) for the one or more sub-band precoder indications is the same for a plurality of different sizes (M) of uplink resources allocated to the user device; a number of bits (m) per each of the sub-band precoder indications; and a sub-band size (J) for each of the one or more sub-bands; wherein at least one of the number of bits (m) per sub-band precoder indication and the sub-band size (J) for each of the one or more sub-bands changes or is a different value based on different sizes (M) of uplink resources allocated to the user device; decoding the downlink control information and extracting, based on at least a portion of the set of uplink sub-band allocation parameters, a number of sub-bands (K) and each of the one or more sub-band precoder indications; and precoding, based on the one or more sub-band precoder indications, data for transmission via the one or more sub-bands.

According to an example implementation, an apparatus includes at least one processor and at least one memory including computer instructions that, when executed by the at least one processor, cause the apparatus to: receive, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determine a set of uplink sub-band allocation parameters, including at least: a total number of bits (N) in the downlink control information for the one or more sub-band precoder indications, wherein the total number of bits (N) for the one or more sub-band precoder indications is the same for a plurality of different sizes (M) of uplink resources allocated to the user device; a number of bits (m) per each of the sub-band precoder indications; and a sub-band size (J) for each of the one or more sub-bands; wherein at least one of the number of bits (m) per sub-band precoder indication and the sub-band size (J) for each of the one or more sub-bands changes or is a different value based on different sizes (M) of uplink resources allocated to the user device; decode the downlink control information and extract, based on at least a portion of the set of uplink sub-band allocation parameters, a number of sub-bands (K) and each of the one or more sub-band precoder indications; and precode, based on the one or more sub-band precoder indications, data for transmission via the one or more sub-bands.

According to an example implementation, a computer program product includes a computer-readable storage medium and storing executable code that, when executed by at least one data processing apparatus, is configured to cause the at least one data processing apparatus to perform a method including: receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determining a set of uplink sub-band allocation parameters, including at least: a total number of bits (N) in the downlink control information for the one or more sub-band precoder indications, wherein the total number of bits (N) for the one or more sub-band precoder indications is the same for a plurality of different sizes (M) of uplink resources allocated to the user device; a number of bits (m) per each of the sub-band precoder indications; and a sub-band size (J) for each of the one or more sub-bands; wherein at least one of the number of bits (m) per sub-band precoder indication and the sub-band size (J) for each of the one or more sub-bands changes or is a different value based on different sizes (M) of uplink resources allocated to the user device; decoding the downlink control information and extracting, based on at least a portion of the set of uplink sub-band allocation parameters, a number of sub-bands (K) and each of the one or more sub-band precoder indications; and precoding, based on the one or more sub-band precoder indications, data for transmission via the one or more sub-bands.

According to an example implementation, a method may include receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determining a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a sub-band size (J) for each of the one or more sub-bands; wherein the sub-band size (J) for each of the one or more sub-bands changes or is a different value based on different sizes (M) of uplink resources allocated to the user device; decoding the downlink control information and extracting, based on at least a portion of the set of uplink sub-band allocation parameters, a number of sub-bands (K), a number of bits (m) per each of the sub-band precoder indications and each of the one or more sub-band precoder indications; and precoding, based on the one or more sub-band precoder indications, data for transmission via the one or more sub-bands.

According to an example implementation, an apparatus includes at least one processor and at least one memory including computer instructions that, when executed by the at least one processor, cause the apparatus to: receive, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determine a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a sub-band size (J) for each of the one or more sub-bands; wherein the sub-band size (J) for each of the one or more sub-bands changes or is a different value based on different sizes (M) of uplink resources allocated to the user device; decode the downlink control information and extract, based on at least a portion of the set of uplink sub-band allocation parameters, a number of sub-bands (K), a number of bits (m) per each of the sub-band precoder indications and each of the one or more sub-band precoder indications; and precode, based on the one or more sub-band precoder indications, data for transmission via the one or more sub-bands.

According to an example implementation, a computer program product includes a computer-readable storage medium and storing executable code that, when executed by at least one data processing apparatus, is configured to cause the at least one data processing apparatus to perform a method including: receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determining a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a sub-band size (J) for each of the one or more sub-bands; wherein the sub-band size (J) for each of the one or more sub-bands changes or is a different value based on different sizes (M) of uplink resources allocated to the user device; decoding the downlink control information and extracting, based on at least a portion of the set of uplink sub-band allocation parameters, a number of sub-bands (K), a number of bits (m) per each of the sub-band precoder indications and each of the one or more sub-band precoder indications; and precoding, based on the one or more sub-band precoder indications, data for transmission via the one or more sub-bands.

According to an example implementation, a method may include receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determining a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a number of bits (m) per each of the sub-band precoder indications; wherein the number of bits (m) per each of the sub-band precoder indications changes or is a different value based on different sizes (M) of uplink resources allocated to the user device; decoding the downlink control information and extracting, based on at least a portion of the set of uplink sub-band allocation parameters, a number of sub-bands (K) and each of the one or more sub-band precoder indications; and precoding, based on the one or more sub-band precoder indications, data for transmission via the one or more sub-bands.

According to an example implementation, an apparatus includes at least one processor and at least one memory including computer instructions that, when executed by the at least one processor, cause the apparatus to: receive, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determine a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a number of bits (m) per each of the sub-band precoder indications; wherein the number of bits (m) per each of the sub-band precoder indications changes or is a different value based on different sizes (M) of uplink resources allocated to the user device; decode the downlink control information and extract, based on at least a portion of the set of uplink sub-band allocation parameters, a number of sub-bands (K) and each of the one or more sub-band precoder indications; and precode, based on the one or more sub-band precoder indications, data for transmission via the one or more sub-bands.

According to an example implementation, a computer program product includes a computer-readable storage medium and storing executable code that, when executed by at least one data processing apparatus, is configured to cause the at least one data processing apparatus to perform a method including: receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determining a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a number of bits (m) per each of the sub-band precoder indications; wherein the number of bits (m) per each of the sub-band precoder indications changes or is a different value based on different sizes (M) of uplink resources allocated to the user device; decoding the downlink control information and extracting, based on at least a portion of the set of uplink sub-band allocation parameters, a number of sub-bands (K) and each of the one or more sub-band precoder indications; and precoding, based on the one or more sub-band precoder indications, data for transmission via the one or more sub-bands.

According to an example implementation, a method includes receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determining a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a number of sub-bands (K); wherein the number of sub-bands (K) changes or is a different value based on different sizes (M) of uplink resources allocated to the user device; decoding the downlink control information and extracting, based on at least a portion of the set of uplink sub-band allocation parameters, a number of bits (m) per each of the sub-band precoder indications and each of the one or more sub-band precoder indications; and precoding, based on the one or more sub-band precoder indications, data for transmission via the one or more sub-bands.

According to an example implementation, an apparatus includes at least one processor and at least one memory including computer instructions that, when executed by the at least one processor, cause the apparatus to: receive, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determine a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a number of sub-bands (K); wherein the number of sub-bands (K) changes or is a different value based on different sizes (M) of uplink resources allocated to the user device; decode the downlink control information and extract, based on at least a portion of the set of uplink sub-band allocation parameters, a number of bits (m) per each of the sub-band precoder indications and each of the one or more sub-band precoder indications; and precode, based on the one or more sub-band precoder indications, data for transmission via the one or more sub-bands.

According to an example implementation, a computer program product includes a computer-readable storage medium and storing executable code that, when executed by at least one data processing apparatus, is configured to cause the at least one data processing apparatus to perform a method including: receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determining a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a number of sub-bands (K); wherein the number of sub-bands (K) changes or is a different value based on different sizes (M) of uplink resources allocated to the user device; decoding the downlink control information and extracting, based on at least a portion of the set of uplink sub-band allocation parameters, a number of bits (m) per each of the sub-band precoder indications and each of the one or more sub-band precoder indications; and precoding, based on the one or more sub-band precoder indications, data for transmission via the one or more sub-bands.

According to an example embodiment, a apparatus includes at least one processor and at least one memory including computer instructions that, when executed by the at least one processor, cause the apparatus to: receive, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determine a set of uplink sub-band allocation parameters, including at least: a total number of bits (N) in the downlink control information for the one or more sub-band precoder indications, wherein the total number of bits (N) for the one or more sub-band precoder indications is the same for a plurality of different sizes (M) of uplink resources allocated to the user device; decode the downlink control information and extracting, based on at least a portion of the set of uplink sub-band allocation parameters, a number of sub-bands (K) and each of the one or more sub-band precoder indications; and precode, based on the one or more sub-band precoder indications, data for transmission via the one or more sub-bands.

The details of one or more examples of implementations are set forth in the accompanying drawings and the description below. Other features will be apparent from the description and drawings, and from the claims.

DETAILED DESCRIPTION

Figure 1:
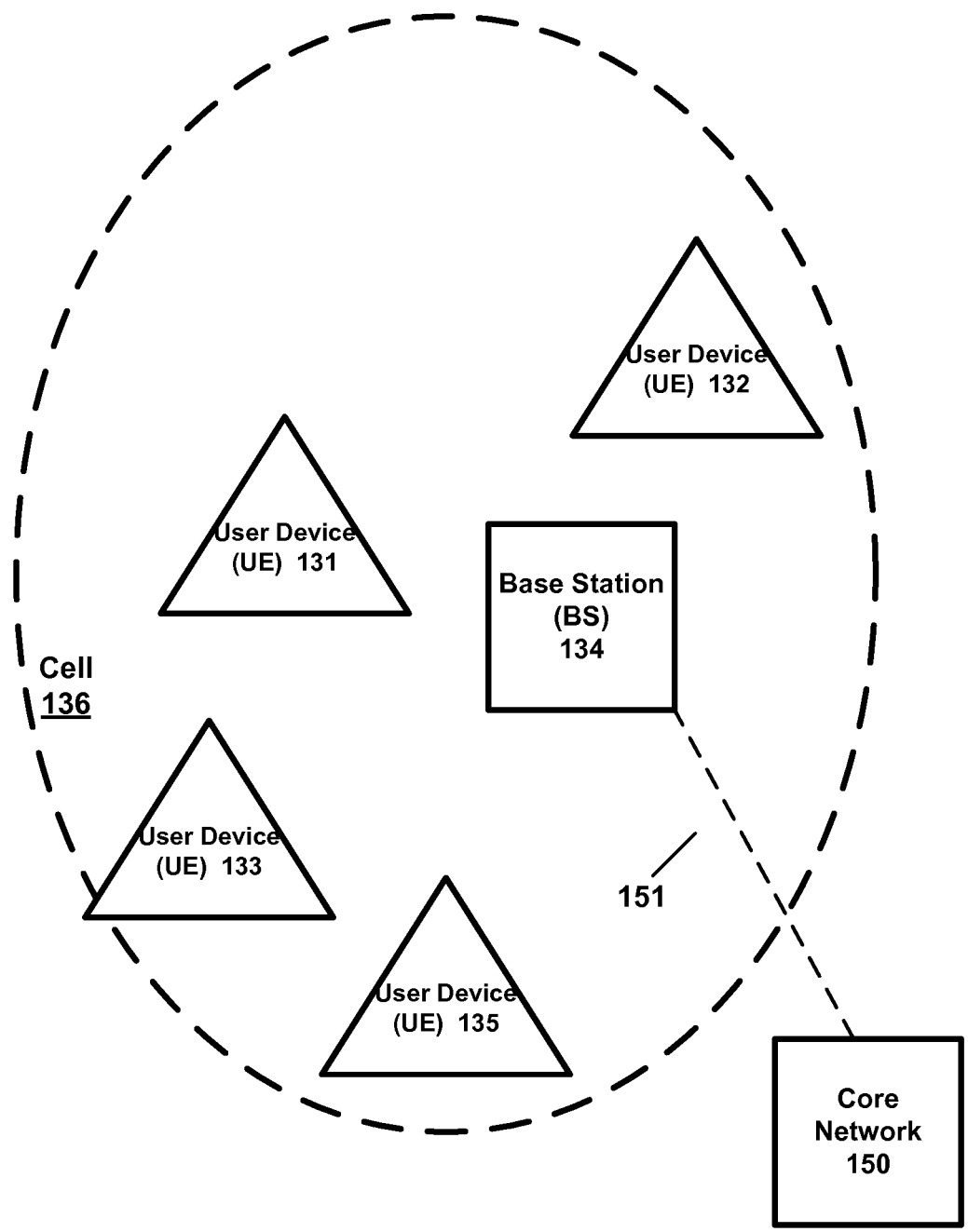
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, or any other wireless network. LTE, 5G, cmWave and mmWave band networks are provided only as illustrative examples, and the various example implementations may be applied to any wireless technology/wireless network.

Various example implementations may relate, for example, to 5G radio access systems (or other systems) with support for Massive MIMO (multiple input, multiple output) and optimized for operating in high carrier frequencies such as cmWave frequencies (e.g. from 3 GHz onwards) or mmWave frequencies, as examples, according to an illustrative example implementation. Those illustrative systems are typically characterized by the need for high antenna gain to compensate for increased pathloss and by the need for high capacity and high spectral efficiency to respond to ever increasing wireless traffic. According to an example implementation, the increased attenuation at higher carrier frequencies may, for example, be compensated by introducing massive (multi-element) antenna arrays and correspondingly antenna gain via beamforming at the access point (AP)/base station (BS) and/or user device. The spectral efficiency may typically improve with the number of spatial streams the system can support and thus with the number of antenna ports at the BS. According to an example implementation, spatial multiplexing may include a transmission technique in MIMO wireless communication to transmit independent and separately encoded data signals, so-called streams, from each of the multiple transmit antennas.

A user device (or a user equipment/UE) may determine and report channel state information (CSI) to a base station (BS). The BS may use the CSI for scheduling or transmission of data to the UE. The CSI provided by a UE to a BS may include one or more of a channel quality indicator (CQI), which may be or may include a quantized signal-to-interference plus noise ratio (SINR) and which may represent a highest recommended modulation and coding scheme for downlink transmission, a rank indication (RI), which may be a recommended transmission rank or number of layers that should be used for downlink transmission, and a transmit precoding matrix index (TPMI) that indicates a recommended precoder or precoding matrix index to be used for precoding transmission, and/or a sounding resource signal indicator (SRI) that indicates a recommended SRS for multiple SRS transmission. Precoding may be considered a generalization of beamforming to support multi-stream (or multi-layer) transmission in multi-antenna wireless communications.

According to an example implementation, a base station (BS) may allocate uplink resources (e.g., physical resource blocks (PRBs)) to a UE (or user device), e.g., based on channel state information (CSI) reported by the UE. The BS may transmit on the downlink control channel to the UE downlink control information (DCI) including an uplink grant (e.g., indicating uplink resources or PRBs allocated to the UE for uplink transmission) and a precoder indication (or a transmit precoding matrix indicator or TPMI) that indicates a precoder to be used by the UE for uplink transmission via the indicated uplink resources/PRBs of the uplink grant. The allocated uplink resources may be divided into one or more sub-bands, where each sub-band is defined (and understood by both the BS and the UE) to comprise a certain number of PRBs.

According to an illustrative example implementation, a UE may use a dual codebook for precoding, including a W1 codebook for wideband (e.g., covering multiple sub-bands or even all sub-bands) precoding, and a W2 codebook for sub-band (or frequency-specific or frequency-selective) precoding. Wideband precoding may include precoding applied by the UE across all frequencies or sub-bands, whereas sub-band precoding may include the UE performing a sub-band (or frequency)-specific precoding for one or more sub-bands or frequencies or set of frequencies. Thus, for example, because uplink channel state information (CSI) may be different for different frequencies or sub-bands, a different sub-band precoder may be used to perform precoding for different sub-bands. Thus, for example, the BS may transmit DCI including an uplink grant (e.g., indicating a set of resources/PRBs allocated to the UE for uplink transmission), a wideband precoder indication (e.g., a transmit precoder matrix index with respect to W1 codebook) and a sub-band precoder indication (e.g., a transmit precoder matrix index with respect to W2 codebook) for each of one or more sub-bands (or portions thereof) allocated to the UE by the uplink grant.

According to an example implementation, unlike LTE, New Radio (NR) or 5G uplink (UL) MIMO supports frequency-selective precoding. Thus, according to an example implementation, a NR (5G) UE may receive precoder information for all related sub-bands, as well as wideband.

There are several problems for the UL grant in DCI. For example, if two-stage (W1, W2) UL codebook design is applied, the indication of precoders for both W1 (wideband) and W2 (sub-band or frequency selective) may typically be signaled by BS/gNB to the UE, e.g., when a central BS/gNB is used. W1 precoder indication is usually a wideband parameter, and an indication of W2 precoder indication(s) is typically sub-band specific. At least in some cases, the overhead of signaling (e.g., via DCI) W2 (or sub-band precoder indications) from the BS/gNB to the UE may be relatively high due to a large number of sub-bands. Allocation of a large portion of DCI payload for W2 (sub-band) precoder indication signaling may present a significant overhead problem for precoder feedback.

According to an example implementation, at least in some cases, if the sub-band size is fixed, the signaling overhead for sub-band precoder indications is a function of UE resource/PRB allocation size. A larger UE PRB allocation (e.g., indicated in UL grant within DCI), which may then indicate more sub-bands in the case sub-band size is fixed, may typically require a larger signaling overhead (e.g., due to a larger number of sub-bands). If the DCI size is designed to signal sub-band precoder indications for sub-bands that cover the full system bandwidth, this approach may be inefficient because many UEs will require sub-band precoder indications only for sub-bands (or a portion thereof) that are within the UL resources allocated to the UE within the UL grant. Thus, including sub-band precoder indications for non-allocated sub-bands is a waste of downlink resources within the DCI. If the BS/gNB only indicates the sub-band precoder indications for sub-bands (or a portion thereof) within the allocated PRBs, the UE UL grant payload size will be variable, which is undesirable for DCI design. For example, a variable size DCI (e.g., due to a variable size of the total number of bits in the DCI for the sub-band precoder indications) may complicate the decoding process at the UE, which may be undesirable.

Therefore, according to an example implementation, a single-step DCI design (where DCI transmitted to a UE is provided in a single step) may be provided that includes a common DCI format for sub-band precoder indications with (or for) different UL resource allocation sizes. Alternatively, the DCI format and/or sub-band allocation parameter configurations may be used in a two-step DCI design, or in any design in which signalling is sent by the BS to the UE that includes one or more sub-band precoder indications. Since the DCI format is common for different UL resource allocation sizes, the DCI size may be fixed, which may simplify the decoding process for the UE/user device.

Assume that the overall DCI (downlink control information) payload size for sub-band precoder information (for one or more sub-band precoder indications) in the UL grant is N bits. The size of precoder indication per sub-band is m bits/sub-band. The number of PRBs allocated to a specific UE is M. If K is the number of sub-bands that the M PRBs span, we have N=m·K. If M PRBs comprise K sub-bands, then, $$K = \frac{M}{J}$$

(assuming, according to an illustrative example implementation that M is a multiple of J, which may or may not be the case), where J is a sub-band size (or sub-band width). Therefore, the total number of bits (N) in the DCI for sub-band precoder indications may be defined or may be determined as:

$$N = \frac{m \cdot M}{J},$$

Where N is a total number of bits in the DCI for the sub-band precoder indications, M a size of uplink resources allocated to the user device via the UL grant, m is the number of bits per sub-band precoder indication, and J is the sub-band size (or sub-band width, e.g., where all sub-bands within the UL resources allocated to the user device via a DCI and corresponding to the sub-band precoder indications contained in the DCI may be the same width or size for that UL resource allocation).

According to an example implementation, the DCI payload size N may be fixed or constant for a plurality (or even all) M values, and the N bits in the DCI for sub-band precoder indications may be distributed differently depending on the UL PRB/resource allocation size M. Thus, for different PRB allocation sizes M, either m or J or both can be varied or changed to keep N the same. In this manner, a flexible DCI format may be provided, while keeping the total number of bits (N) in the DCI for sub-band precoder indications the same or constant, e.g., in order to simplify the UE's decoding of the DCI (including to simplify the UE's decoding of sub-band precoder indications transmitted via the DCI).

Some illustrative example implementations of sub-band allocation parameters will now be described. As noted, for different PRB allocation sizes M (or as M changes), either m (Table 1) or J (table 2) or both (Table 3) can be varied or changed to keep N the same.

TABLE 1

Sub-band allocation parameters with fixed N = 10 and fixed K = 5

| Number of Sub-bands (K) | Allocated BW (M) (MHz) | Sub-band size (J) (MHz) | bits/sub-band (m) | N (bits) |
| --- | --- | --- | --- | --- |
| 5 | 100 | 20 | 2 | 10 |
| 5 | 80 | 16 | 2 | 10 |
| 5 | 50 | 10 | 2 | 10 |
| 5 | 30 | 6 | 2 | 10 |

As shown in Table 1, a set of sub-band allocation parameters is shown, according to an example implementation. In Table 1, for example, sub-band allocation parameters are shown in the case where N (a total number of bits in the DCI for the sub-band precoder indications), K (a number of sub-bands) and m (the number of bits per sub-band precoder indication) are fixed or constant for different values for M, and where J (sub-band size or sub-band width) varies (or changes) based on M (or based on different values for M). M may be indicated by or within the UL grant sent by the BS/gNB to the UE. Thus, as can be seen in the example of Table 1, N (a total number of bits in the DCI for the sub-band precoder indications) is fixed at 10 bits; K (the number of sub-bands) is fixed at 5 sub-bands; m (the size of a precoder indication per sub-band) is set at 2 bits; while J (sub-band size) varies or changes from 20 MHz to 6 MHz as M (the number of PRBs or amount of UL resources allocated to a specific UE) varies or changes from 100 MHz to 30 MHz. Thus, the 10 bits for sub-band precoder indications may be used in this example of Table 1 to provide a 2 bit per sub-band precoder indication for each of 5 sub-bands.

With a given precoder indication size per sub-band of m bits/sub-band, the number of sub-bands is determined as $$K = \frac{N}{m}.$$

If the allocation size is M PRBs, each sub-band will have $$J = \frac{M}{K} \; PRBs$$

(assuming M is a multiple of K). This approach, according to this illustrative example, fixes the number of sub-bands to K, regardless of the PRB allocation size (M). The sub-band size J will be variable, depending on the allocated UE-specific PRB allocation size M. A larger PRB allocation M will result in a wider sub-band size J. An example of such design can be shown in Table 1 with N=10 and K=5. It shows that the sub-band size is variable.

TABLE 2

Sub-band allocation parameters with fixed N = 10, and fixed J = 20 (MHz)

| Number of Sub-bands (K) | Allocated BW (M) (MHz) | Sub-band size (J) (MHz) | bits/sub-band (m) | N (bits) |
| --- | --- | --- | --- | --- |
| 5 | 100 | 20 | 2 | 10 |
| 3 | 60 | 20 | 3 | 9* |
| 2 | 40 | 20 | 5 | 10 |
| 1 | 20 | 20 | 10 | 10 |

(*1 bit is reserved)

As shown in Table 2, a set of sub-band allocation parameters is shown, according to another example implementation. In Table 2, for example, sub-band allocation parameters are shown in the case where N (a total number of bits in the DCI for the sub-band precoder indications) and J (sub-band size or sub-band width) are fixed or constant for different values for M, and where K (a number of sub-bands) and m (the number of bits per sub-band precoder indication) each vary (or change) based on M (or based on different values for M). Thus, as can be seen in the example of Table 2, N (a total number of bits in the DCI for the sub-band precoder indications) is fixed at 10 bits (including a reserved bit in the case of m=3); J (sub-band size or sub-band width) is fixed at 20 MHz; whereas K (the number of sub-bands) varies from 5 sub-bands to 1 sub-band, and m (the size of a precoder indication per sub-band) varies from 2 bits to 10 bits per sub-band precoder indication as M varies from 100 MHz to 20 MHz, for example. Thus, the 10 bits (N) for sub-band precoder indications may be used in this example of Table 2 to provide a m=2->10 bit sub-band precoder indication (m) for each of K=5->1 sub-bands, based on the value of M.

Referring to Table 2, with a fixed sub-band DCI payload size N and with a given sub-band size of J PRBs, the total number of sub-bands is $$K = \frac{M}{J}$$

(assuming m is a multiple of J). The payload size per sub band will be $$m = \frac{N}{K} = N \cdot \frac{J}{M} \text{ bits.}$$

This approach fixes the sub-band size J. The payload size per sub-band m, providing the precoder indication, will be a function of UE PRB allocation size M. A smaller PRB allocation size M will have a larger m, as the size of precoder indication per sub-band. One example of this design is shown in Table 2 with N=10 and a fixed sub-band size J=20 MHz. The number of sub-bands and the related payload bits/per sub-band are variable. When a narrow BW (bandwidth) is allocated to the UE, the UE has a few sub-bands while each sub-band can have a large payload size in UL grant.

From the example design in Table 2, some allocations have large payload size per sub-band as large as 10 bits/sub-band for 20 MHz allocation. If the payload is used to signal sub-band PMI, such design is suitable to accommodate high-resolution codebook design with frequency-selective precoding.

As shown in Table 3, a set of sub-band allocation parameters is shown, according to another example implementation. In Table 3, for example, sub-band allocation parameters are shown in the case where N (a total number of bits in the DCI for the sub-band precoder indications) is fixed or constant for different values for M, and where J (sub-band size or sub-band width), K (a number of sub-bands) and m (the number of bits per sub-band precoder indication) each vary (or change) based on M (or change based on different values for M). Thus, as can be seen in the example of Table 3, N (a total number of bits in the DCI for the sub-band precoder indications) is fixed at 10 bits (including a reserved bit in the case of m=3); whereas the other parameters of K, J and m each vary, to provide even more flexibility, while maintaining N fixed or constant, even though M may be different values.

TABLE 3

Example: Sub-band allocation parameters with fixed N = 10

| Number of Sub-bands (K) | Allocated BW (M) (MHz) | Sub-band size (J) (MHz) | bits/sub-band (m) | N (bits) |
|---|---|---|---|---|
| 5 | 100 | 20 | 2 | 10 |
| 5 | 80 | 16 | 2 | 10 |
| 3 | 60 | 20 | 3 | 9* |
| 5 | 50 | 10 | 2 | 10 |

(*1 bit is reserved)

Thus, as shown in Table 3, with a fixed sub-band DCI payload size N, both the number of sub-bands K and sub-band size J can be variable for a given PRB allocation size M. One possible assignment of K and J is shown in Table 3 as an example design, with UE BW allocation from 20 MHz to 100 MHz.

Note that Table 3 describes an illustrative example for sub-band allocation with a fixed payload size N=10 bits. Other examples are possible to adjust number of sub-bands K and/or sub-band size J. The DCI design shall be able to accommodate corresponding uplink codebook design with proper size of precoder indication/feedback. The DCI payload can thus be flexibly used for sub-band PMI indication.

The above examples illustrate implementations in which the precoder indications in the DCI correspond to sub-bands that are all of the same size. Therefore, the size of the allocated uplink resources is an integer multiple of the sub-band size. In some implementations, the sub-band boundaries may be defined to be independent of the allocated uplink resources. In such cases, the sub-bands are not aligned to begin and end at the boundaries of the uplink resources allocated to the UE. Then, the allocated uplink resources may only partially overlap with the predefined sub-bands at either edge. Therefore, these edge sub-bands are smaller in size relative to the other sub-bands. In other words, the precoding of uplink transmission, based on the precoder indication in the DCI, is done for smaller sub-bands at the edges of the allocated uplink resources as compared with the central sub-bands, which are all of the same size. Both the BS and the UE would have a common understanding of the sub-band definitions and hence the number of sub-bands within the allocated uplink resources. Therefore, the UE would correctly interpret the N bits used for precoder indication in the DCI as intended by the BS.

To accommodate this flexible use of DCI, a combination of predefined configurations and RRC (radio resource control) signalling may be used. Each of the above tables can correspond to a configuration for sub-band PMI indication that is predefined in the specifications. The gNB/BS may then signal, for example in the SIB (system information block), which configuration (e.g., which table) it is using. Alternatively, if the gNB/BS determines that it is more advantageous to use one configuration for a first set of UEs and a different configuration for a second set of UEs, then it may signal the configuration through UE-specific RRC signalling.

Alternatively, the gNB may configure the entire table through RRC signalling (e.g., either in the SIB/system information block or through UE-specific RRC signalling).

This would allow the network even more flexibility in configuration—it can expand or shrink the size of the table semi-statically.

Therefore, various example implementations may include one or more of the following features and/or advantages, by way of example:
1) A single-step DCI design may be used (or other design) for different UL allocation sizes (M) that allows for flexibly using the fixed DCI payload size to indicate the sub-band precoder information.
2) The total number of payload bits (N) for sub-band precoder indications in the DCI is kept fixed by varying for different allocation sizes either
   i) the size (J) of the sub-band for which each precoder is indicated, and keeping the number (m) of bits per sub-band precoder indication fixed and the number (K) of sub-bands fixed (for different values of M), or
   ii) the number (m) of bits used for indicating each sub-band precoder indication keeping the sub-band size (J) fixed,
   iii) or both the size (J) of the sub-band and the number (m) of bits for each sub-band precoder indication.
3) The network (or BS/gNB) may signal to UE how the UE may, for example, interpret the DCI for precoder indication through RRC (radio resource control) configuration (e.g., indicating which of the Tables, e.g., Table 1, Table 2, or Table 3, should be used for decoding DCI), which can include both SIB indication and UE-specific signalling. Or, the UE may be preconfigured with one or more parameters, such as which Table will be used, and/or preconfigured with a specific value for J, m, K, etc. Or signalling may be used to allow a BS/gNB to indicate to the UE which of the Tables (e.g., which set of sub-band allocation parameters) will be used, and/or to indicate a fixed value for one or more of the parameters such as values for J, m and/or K.

Example 1

Figure 2:
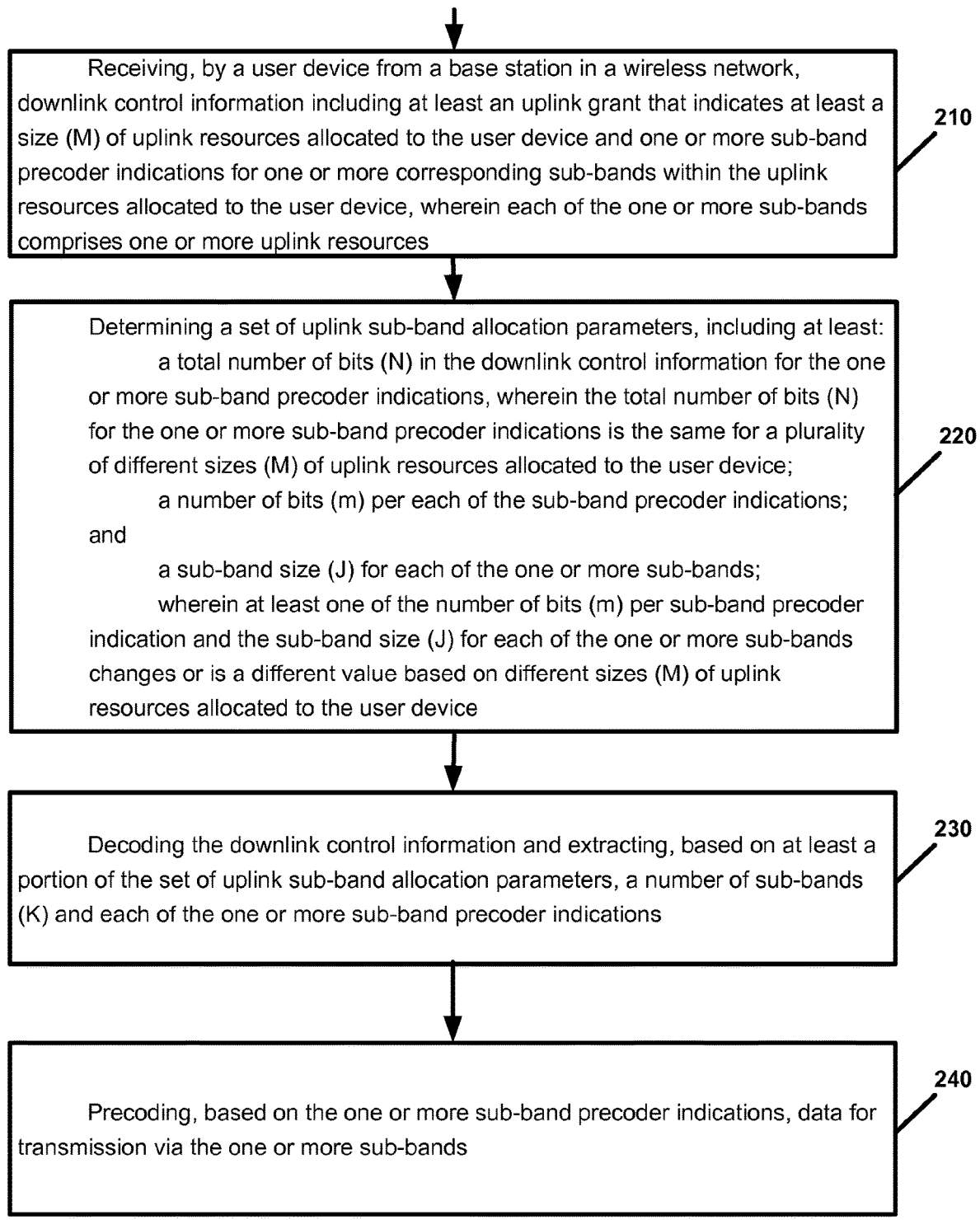
FIG. 2 is a flow chart illustrating operation of a user device according to an example implementation.

FIG. 2 is a flow chart illustrating operation of a user device according to an example implementation. Operation 210 includes receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources. Operation 220 includes determining a set of uplink sub-band allocation parameters, including at least: a total number of bits (N) in the downlink control information for the one or more sub-band precoder indications, wherein the total number of bits (N) for the one or more sub-band precoder indications is the same for a plurality of different sizes (M) of uplink resources allocated to the user device; a number of bits (m) per each of the sub-band precoder indications; and a sub-band size (J) for each of the one or more sub-bands; wherein at least one of the number of bits (m) per sub-band precoder indication and the sub-band size (J) for each of the one or more sub-bands changes or is a different value based on different sizes (M) of uplink resources allocated to the user device. Operation 230 includes decoding the downlink control information and extracting, based on at least a portion of the set of uplink sub-band allocation parameters, a number of sub-bands (K) and each of the one or more sub-band precoder indications. Operation 240 includes precoding, based on the one or more sub-band precoder indications, data for transmission via the one or more sub-bands.

Example 2

According to an example implementation of example 1, wherein the sub-band size for at least one of the one or more sub-bands within the uplink resources allocated to the user device is different from the sub-band size for the other sub-bands within the uplink resources allocated to the user device. For example, this may allow the uplink resource allocation to be a non-integer multiple of the fixed sub-band size and to allow sub-band boundaries to be defined independently of the uplink resource allocation.

Example 3

According to an example implementation of any of examples 1-2, further comprising: transmitting, by the user device, the precoded data via the one or more sub-bands of the uplink resources allocated to the user device.

Example 4

According to an example implementation of any of examples 1-3, wherein the determining a set of uplink sub-band allocation parameters comprises: determining, by the user device, a set of uplink sub-band allocation parameters based on at least one of the following: a table lookup based on the size (M) of uplink resources allocated to the user device; and a formula that indicates a set of uplink sub-band allocation parameters depending on the size (M) of uplink resources allocated to the user device.

Example 5

According to an example implementation of any of examples 1-4, wherein the determining a set of uplink sub-band allocation parameters comprises: determining the total number of bits (N) in the downlink control information for the one or more sub-band precoder indications based on one of the following: the user device being previously configured with the total number of bits (N) in the downlink control information for the one or more sub-band precoder indications; and receiving, by the user device, a control message from the base station indicating the total number of bits (N) in the downlink control information for the one or more sub-band precoder indications.

Example 6

According to an example implementation of any of examples 1-5, wherein the determining a set of uplink sub-band allocation parameters comprises determining a number of sub-bands (K) based on one of the following: the user device being previously configured with the number of sub-bands (K); and receiving, by the user device, a control message from the base station indicating the number of sub-bands (K).

Example 7

According to an example implementation of any of examples 1-6, wherein the determining the sub-band size for each of the one or more sub-bands comprises one of the following: determining, by the user device, the same sub-band size (J) for each of the one or more sub-bands based on a formula depending on the number of sub-bands (K); and determining, by the user device, the sub-band size for each of the one or more sub-bands based on at least: determining, by the user device, the sub-band size for at least one of the first and last sub-bands within the uplink resources allocated to the user device based on previous configuration; determining, by the user device, the same sub-band size for each of the remaining sub-bands within the uplink resources allocated to the user device based on a formula depending on the number of sub-bands (K). For example, this may allow for dividing up the allocated uplink resources equally, and/or to allow for different sizes for the first and last sub-bands based on previous configuration (e.g., of allowable sub-band boundaries).

Example 8

According to an example implementation of any of examples 1-7, wherein: the sub-band size (J) for each of the one or more sub-bands is different for a plurality of different sizes (M) of uplink resources allocated to the user device; a number of sub-bands (K) is a same value for different sizes (M) of uplink resources allocated to the user device; and the number of bits (m) per each of the sub-band precoder indications is a same value for different sizes (M) of uplink resources allocated to the user device.

Example 9

According to an example implementation of any of examples 1-8, wherein: the sub-band size (J) for each of the one or more sub-bands is a same value for different sizes (M) of uplink resources allocated to the user device; a number of sub-bands (K) is different for a plurality of different sizes (M) of uplink resources allocated to the user device; and the number of bits (m) per each of the sub-band precoder indications is different for a plurality of different sizes (M) of uplink resources allocated to the user device.

Example 10

According to an example implementation of any of examples 1-9, wherein: the sub-band size (J) for each of the one or more sub-bands is different for a plurality of different sizes (M) of uplink resources allocated to the user device; a number of sub-bands (K) is different for a plurality of different sizes (M) of uplink resources allocated to the user device; and the number of bits (m) per each of the sub-band precoder indications is different for a plurality of different sizes (M) of uplink resources allocated to the user device.

Example 11

According to an example implementation of any of examples 1-10, wherein the downlink control information is provided to the user device via a single-step downlink configuration.

Example 12

An apparatus comprising at least one processor and at least one memory including computer instructions that, when executed by the at least one processor, cause the apparatus to perform a method of any of examples 1-11.

Example 13

Figure 3:
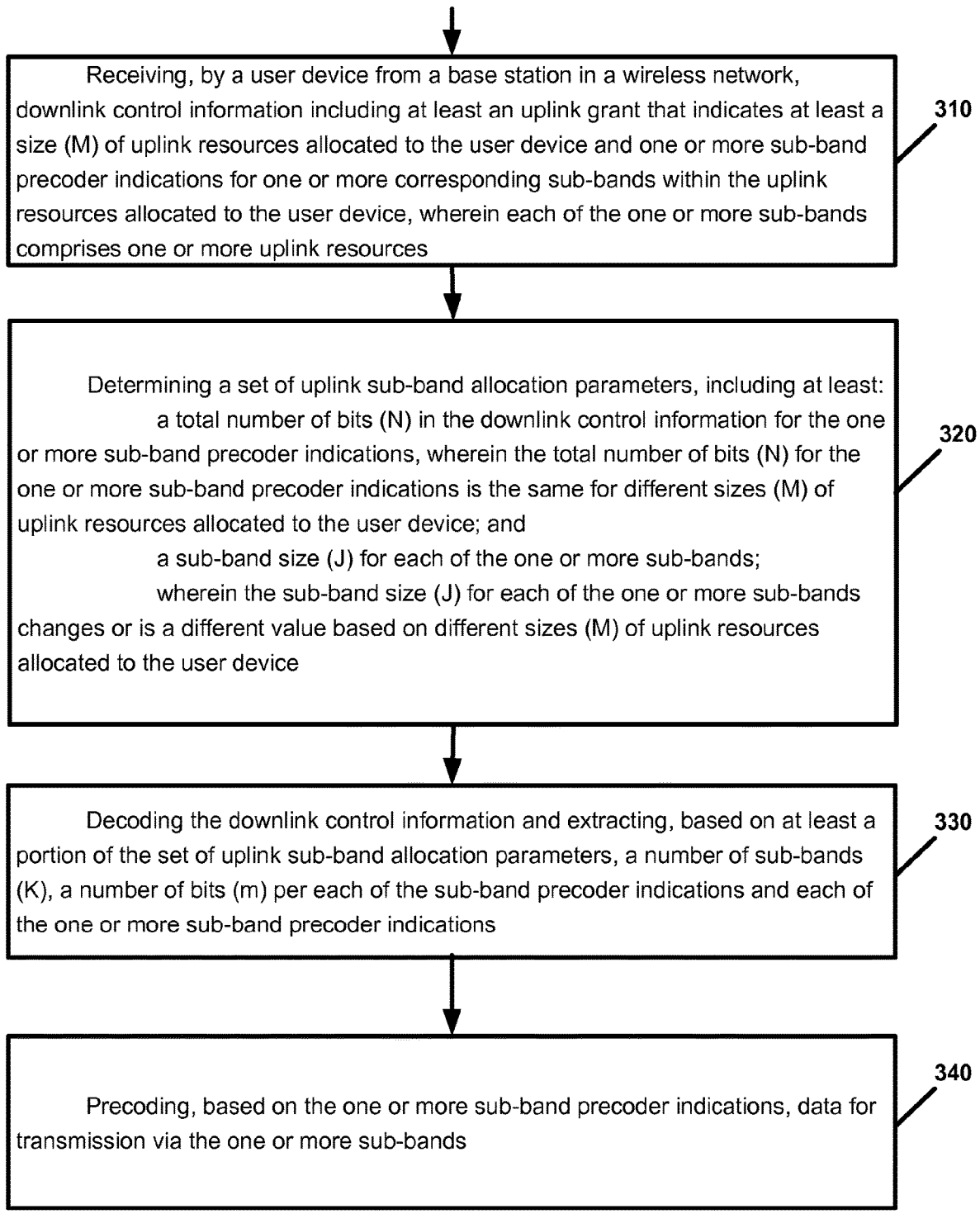
FIG. 3 is a flow chart illustrating operation of a user device according to another example implementation.

FIG. 3 is a flow chart illustrating operation of a user device according to an example implementation. Operation 310 includes receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; Operation 320 includes determining a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a sub-band size (J) for each of the one or more sub-bands; wherein the sub-band size (J) for each of the one or more sub-bands changes or is a different value based on different sizes (M) of uplink resources allocated to the user device. Operation 330 includes decoding the downlink control information and extracting, based on at least a portion of the set of uplink sub-band allocation parameters, a number of sub-bands (K), a number of bits (m) per each of the sub-band precoder indications and each of the one or more sub-band precoder indications. And operation 340 includes precoding, based on the one or more sub-band precoder indications, data for transmission via the one or more sub-bands.

Example 14

According to an example implementation of example 13, wherein the sub-band size for at least one of the one or more sub-bands within the uplink resources allocated to the user device is different from the sub-band size for the other sub-bands within the uplink resources allocated to the user device.

Example 15

According to an example implementation of any of examples 13-14, wherein a number of sub-bands (K) is a same value for different sizes (M) of uplink resources allocated to the user device; and the number of bits (m) per each of the sub-band precoder indications is a same value for different sizes (M) of uplink resources allocated to the user device.

Example 16

According to an example implementation of any of examples 13-15, and further comprising: transmitting, by the user device, the precoded data via the one or more sub-bands of the uplink resources allocated to the user device.

Example 17

According to an example implementation of any of examples 13-16, wherein the determining a set of uplink sub-band allocation parameters comprises: determining, by the user device, a set of uplink sub-band allocation parameters based on at least one of the following: a table lookup based on the size (M) of uplink resources allocated to the user device; and a formula that indicates a set of uplink sub-band allocation parameters depending on the size (M) of uplink resources allocated to the user device.

Example 18

An apparatus comprising at least one processor and at least one memory including computer instructions that, when executed by the at least one processor, cause the apparatus to perform a method of any of examples 13-17.

Example 19

An apparatus comprising a computer program product including a non-transitory computer-readable storage medium and storing executable code that, when executed by at least one data processing apparatus, is configured to cause the at least one data processing apparatus to perform a method of any of examples 13-17.

Example 20

Figure 4:
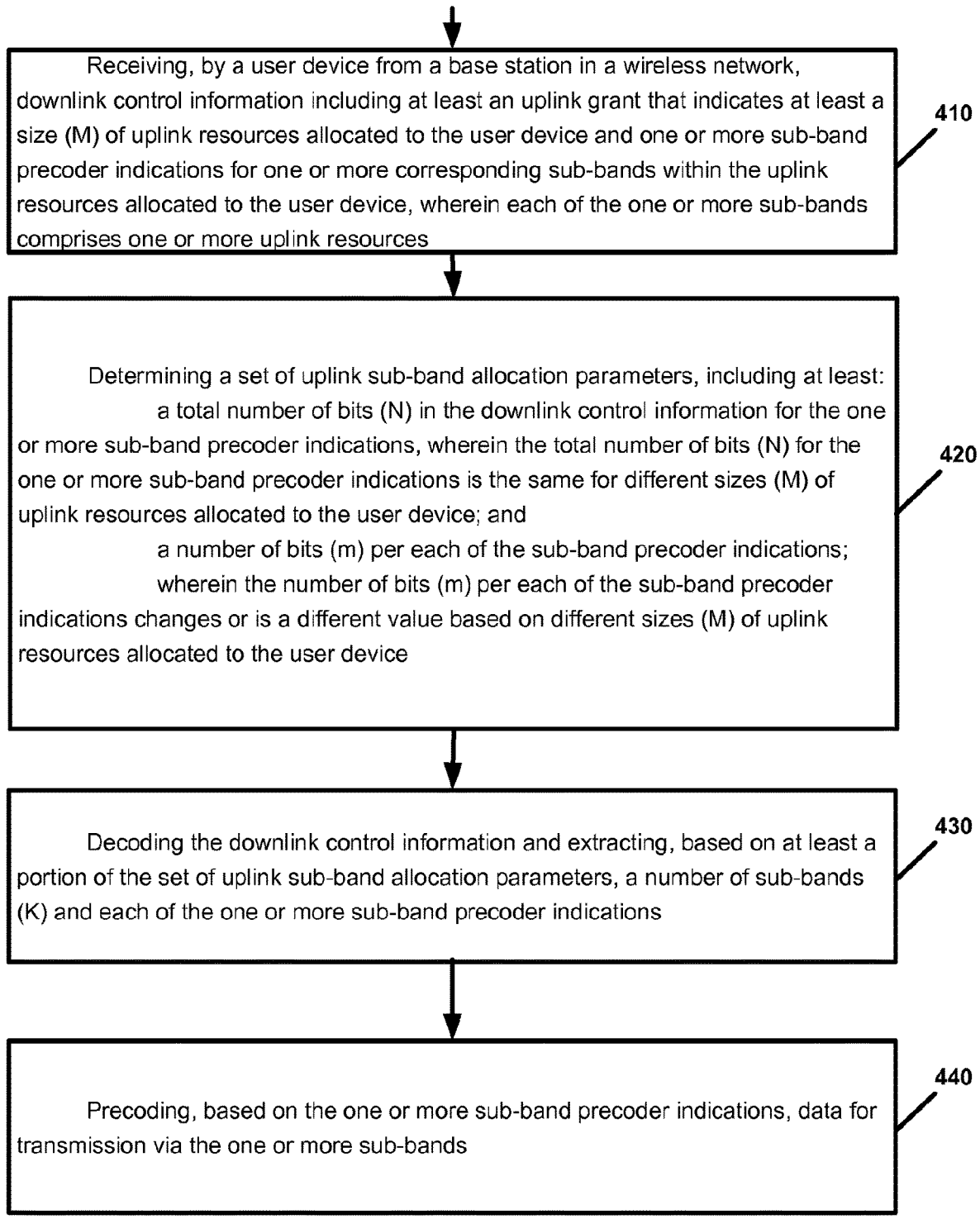
FIG. 4 is a flow chart illustrating operation of a user device according to another example implementation.

FIG. 4 is a flow chart illustrating operation of a user device according to an example implementation. Operation 410 includes receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources. Operation 420 includes determining a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a number of bits (m) per each of the sub-band precoder indications; wherein the number of bits (m) per each of the sub-band precoder indications changes or is a different value based on different sizes (M) of uplink resources allocated to the user device. Operation 430 includes decoding the downlink control information and extracting, based on at least a portion of the set of uplink sub-band allocation parameters, a number of sub-bands (K) and each of the one or more sub-band precoder indications. And, operation 440 includes precoding, based on the one or more sub-band precoder indications, data for transmission via the one or more sub-bands.

Example 21

According to an example implementation of example 20, wherein the sub-band size (J) for each of the one or more sub-bands is a same value for different sizes (M) of uplink resources allocated to the user device; and a number of sub-bands (K) is different for a plurality of different sizes (M) of uplink resources allocated to the user device.

Example 22

An apparatus comprising at least one processor and at least one memory including computer instructions that, when executed by the at least one processor, cause the apparatus to perform a method of any of examples 20-21.

Example 23

An apparatus comprising a computer program product including a non-transitory computer-readable storage medium and storing executable code that, when executed by at least one data processing apparatus, is configured to cause the at least one data processing apparatus to perform a method of examples 20-21.

Example 24

Figure 5A:
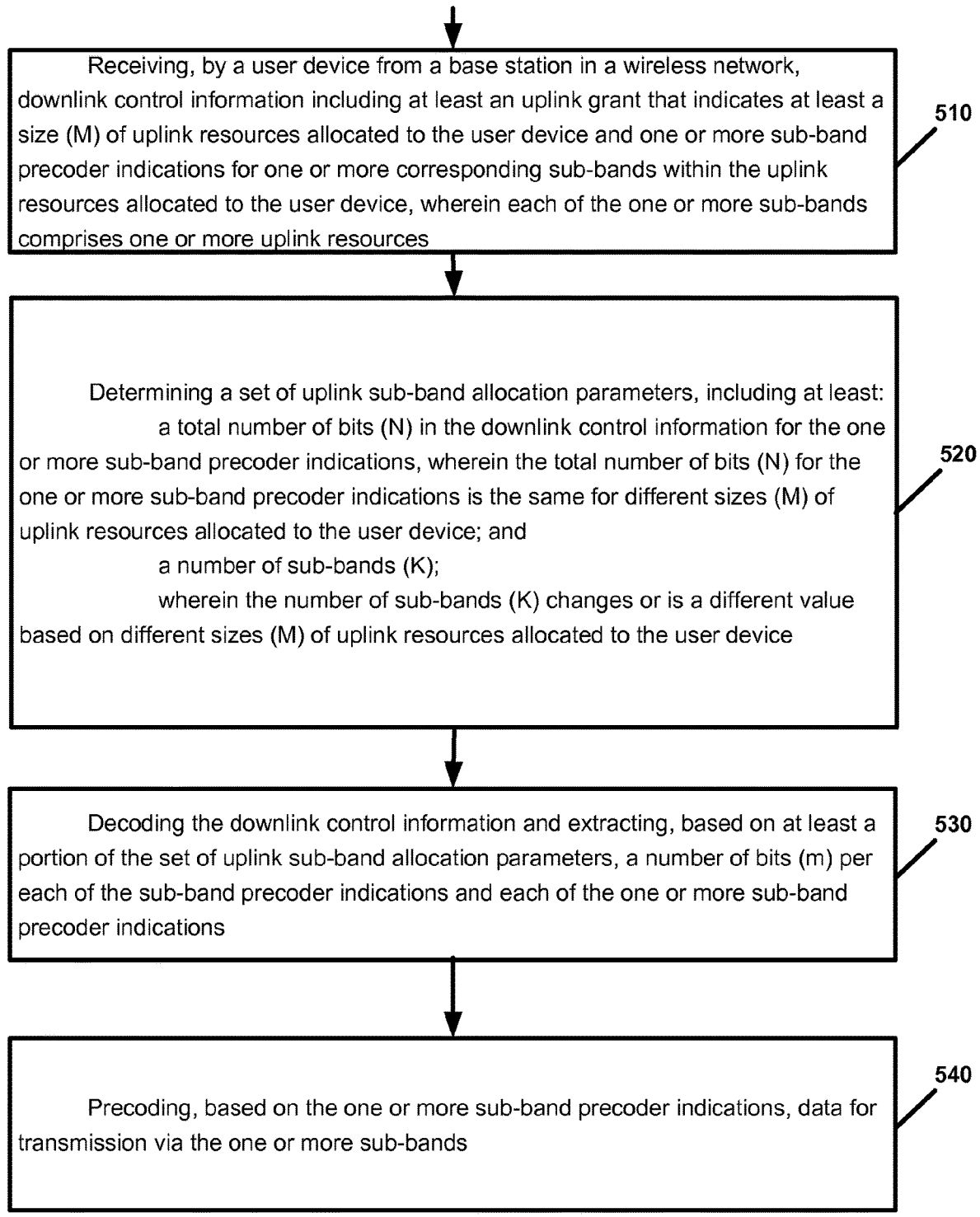
FIG. 5A is a flow chart illustrating operation of a user device according to another example implementation.

FIG. 5A is a flow chart illustrating operation of a user device according to an example implementation. Operation 510 includes receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources. Operation 520 includes determining a set of uplink sub-band allocation parameters, including at least: a total number of bits (N) in the downlink control information for the one or more sub-band precoder indications, wherein the total number of bits (N) for the one or more sub-band precoder indications is the same for different sizes (M) of uplink resources allocated to the user device; and a number of sub-bands (K); wherein the number of sub-bands (K) changes or is a different value based on different sizes (M) of uplink resources allocated to the user device. Operation 530 includes decoding the downlink control information and extracting, based on at least a portion of the set of uplink sub-band allocation parameters, a number of bits (m) per each of the sub-band precoder indications and each of the one or more sub-band precoder indications. Operation 540 includes precoding, based on the one or more sub-band precoder indications, data for transmission via the one or more sub-bands.

Example 25

According to an example implementation of example 24, wherein the sub-band size (J) for each of the one or more sub-bands is a same value for different sizes (M) of uplink resources allocated to the user device; and a number of bits (m) per each of the sub-band precoder indications is different for a plurality of different sizes (M) of uplink resources allocated to the user device.

Example 26

An apparatus comprising at least one processor and at least one memory including computer instructions that, when executed by the at least one processor, cause the apparatus to perform a method of any of examples 1-11, 13-17, 20, 21, 24 and 25.

Example 27

An apparatus comprising a computer program product including a non-transitory computer-readable storage medium and storing executable code that, when executed by at least one data processing apparatus, is configured to cause the at least one data processing apparatus to perform a method of any of examples 1-11, 13-17, 20, 21, 24 and 25.

Example 28

An apparatus comprising means for performing a method of any of examples 1-11, 13-17, 20, 21, 24 and 25.

Example 29

Figure 5B:
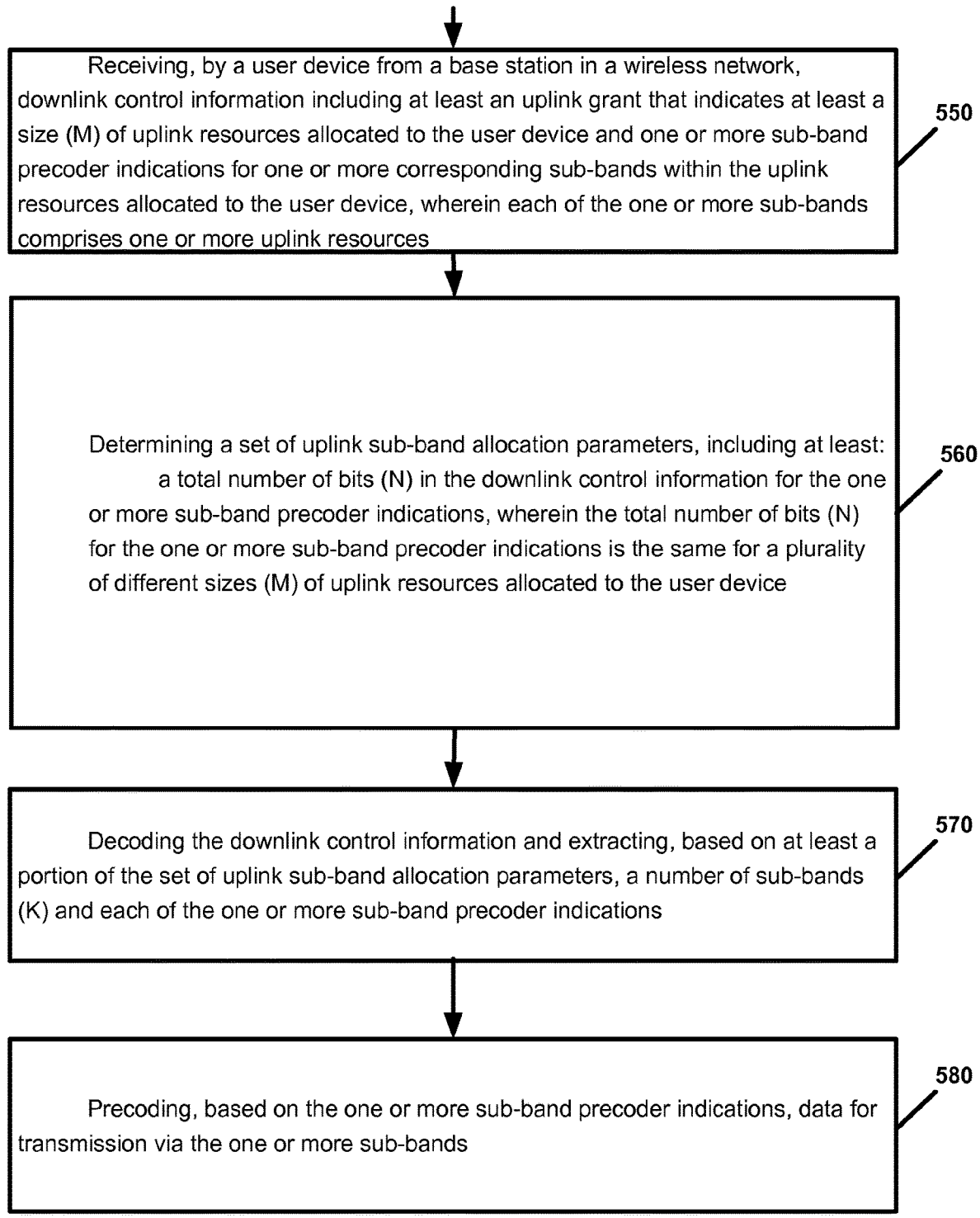
FIG. 5B is a flow chart illustrating operation of a user device according to another example implementation.

FIG. 5B is a flow chart illustrating operation of a user device according to an example implementation. Operation 550 includes receiving, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources. Operation 560 includes determining a set of uplink sub-band allocation parameters, including at least: a total number of bits (N) in the downlink control information for the one or more sub-band precoder indications, wherein the total number of bits (N) for the one or more sub-band precoder indications is the same for a plurality of different sizes (M) of uplink resources allocated to the user device. Operation 570 includes decoding the downlink control information and extracting, based on at least a portion of the set of uplink sub-band allocation parameters, a number of sub-bands (K) and each of the one or more sub-band precoder indications. Operation 580 includes precoding, based on the one or more sub-band precoder indications, data for transmission via the one or more sub-bands.

Example 30

The method of example 29 wherein the determining further comprises determining at least one of the following: a number of bits (m) per each of the sub-band precoder indications; and a sub-band size (J) for each of the one or more sub-bands; wherein at least one of the number of bits (m) per sub-band precoder indication and the sub-band size (J) for each of the one or more sub-bands changes or is a different value based on different sizes (M) of uplink resources allocated to the user device.

Example 31

The method of any of examples 29-30 wherein the determining further comprises determining: a number of bits (m) per each of the sub-band precoder indications; wherein the number of bits (m) per sub-band precoder indication changes or is a different value based on different sizes (M) of uplink resources allocated to the user device.

Example 32

The method of any of examples 29-31 wherein: the sub-band size (J) for each of the one or more sub-bands is a same value for different sizes (M) of uplink resources allocated to the user device; and a number of sub-bands (K) is different for a plurality of different sizes (M) of uplink resources allocated to the user device.

Example 33

The method of any of examples 29-32 wherein the determining further comprises determining the following: a sub-band size (J) for each of the one or more sub-bands; wherein the sub-band size (J) for each of the one or more sub-bands changes or is a different value based on different sizes (M) of uplink resources allocated to the user device.

Example 34

The method of any of examples 29-33 wherein the sub-band size (J) for at least one of the one or more sub-bands within the uplink resources allocated to the user device is different from the sub-band size for the other sub-bands within the uplink resources allocated to the user device.

Example 35

The method of any of examples 29-34 wherein: a number of sub-bands (K) is a same value for different sizes (M) of uplink resources allocated to the user device; and the number of bits (m) per each of the sub-band precoder indications is a same value for different sizes (M) of uplink resources allocated to the user device.

Example 36

The method of any of examples 29-35 wherein the decoding comprises: decoding the downlink control information and extracting, based on at least a portion of the set of uplink sub-band allocation parameters, a number of sub-bands (K), a number of bits (m) per each of the sub-band precoder indications and each of the one or more sub-band precoder indications.

Example 37

The method of any of examples 29-36 and further comprising: transmitting, by the user device, the precoded data via the one or more sub-bands of the uplink resources allocated to the user device.

Example 38

The method of any of examples 29-37 wherein the determining a set of uplink sub-band allocation parameters comprises: determining, by the user device, a set of uplink sub-band allocation parameters based on at least one of the following: a table lookup based on the size (M) of uplink resources allocated to the user device; and a formula that indicates a set of uplink sub-band allocation parameters depending on the size (M) of uplink resources allocated to the user device.

Example 39

The method of any of examples 29-38 wherein the determining a set of uplink sub-band allocation parameters comprises: determining the total number of bits (N) in the downlink control information for the one or more sub-band precoder indications based on one of the following: the user device being previously configured with the total number of bits (N) in the downlink control information for the one or more sub-band precoder indications; and receiving, by the user device, a control message from the base station indicating the total number of bits (N) in the downlink control information for the one or more sub-band precoder indications.

Example 40

The method of any of examples 29-39 wherein the determining a set of uplink sub-band allocation parameters comprises determining a number of sub-bands (K) based on one of the following: the user device being previously configured with the number of sub-bands (K); and receiving, by the user device, a control message from the base station indicating the number of sub-bands (K).

Example 41

The method of any of examples 29-40 wherein the determining the sub-band size for each of the one or more sub-bands comprises one of the following: determining, by the user device, the same sub-band size (J) for each of the one or more sub-bands based on a formula depending on the number of sub-bands (K); and determining, by the user device, the sub-band size (J) for each of the one or more sub-bands based on at least: determining, by the user device, the sub-band size (J) for at least one of the first and last sub-bands within the uplink resources allocated to the user device based on previous configuration; determining, by the user device, the same sub-band (J) size for each of the remaining sub-bands within the uplink resources allocated to the user device based on a formula depending on the number of sub-bands (K).

Example 42

The method of any of examples 29-41 wherein: the sub-band size (J) for each of the one or more sub-bands is different for a plurality of different sizes (M) of uplink resources allocated to the user device; a number of sub-bands (K) is a same value for different sizes (M) of uplink resources allocated to the user device; and the number of bits (m) per each of the sub-band precoder indications is a same value for different sizes (M) of uplink resources allocated to the user device.

Example 43

The method of any of examples 29-42 wherein: the sub-band size (J) for each of the one or more sub-bands is a same value for different sizes (M) of uplink resources allocated to the user device; a number of sub-bands (K) is different for a plurality of different sizes (M) of uplink resources allocated to the user device; and the number of bits (m) per each of the sub-band precoder indications is different for a plurality of different sizes (M) of uplink resources allocated to the user device.

Example 44

The method of any of examples 29-43 wherein: the sub-band size (J) for each of the one or more sub-bands is different for a plurality of different sizes (M) of uplink resources allocated to the user device; a number of sub-bands (K) is different for a plurality of different sizes (M) of uplink resources allocated to the user device; and the number of bits (m) per each of the sub-band precoder indications is different for a plurality of different sizes (M) of uplink resources allocated to the user device.

Example 45

The method of any of examples 29-44 wherein the downlink control information is provided to the user device via a single-step downlink configuration.

Example 46

An apparatus comprising at least one processor and at least one memory including computer instructions that, when executed by the at least one processor, cause the apparatus to perform the method of any of examples 29-45.

Example 47

A non-transitory computer-readable storage medium comprising instructions stored thereon that, when executed by at least one processor, are configured to cause a computing system to perform the method of any of examples 29-45.

Example 48

An apparatus comprising means for performing the method of any of examples 29-45.

Example 49

An apparatus comprising at least one processor and at least one memory including computer instructions that, when executed by the at least one processor, cause the apparatus to: receive, by a user device from a base station in a wireless network, downlink control information including at least an uplink grant that indicates at least a size (M) of uplink resources allocated to the user device and one or more sub-band precoder indications for one or more corresponding sub-bands within the uplink resources allocated to the user device, wherein each of the one or more sub-bands comprises one or more uplink resources; determine a set of uplink sub-band allocation parameters, including at least: a total number of bits (N) in the downlink control information for the one or more sub-band precoder indications, wherein the total number of bits (N) for the one or more sub-band precoder indications is the same for a plurality of different sizes (M) of uplink resources allocated to the user device; decode the downlink control information and extracting, based on at least a portion of the set of uplink sub-band allocation parameters, a number of sub-bands (K) and each of the one or more sub-band precoder indications; and precode, based on the one or more sub-band precoder indications, data for transmission via the one or more sub-bands.

Figure 6:
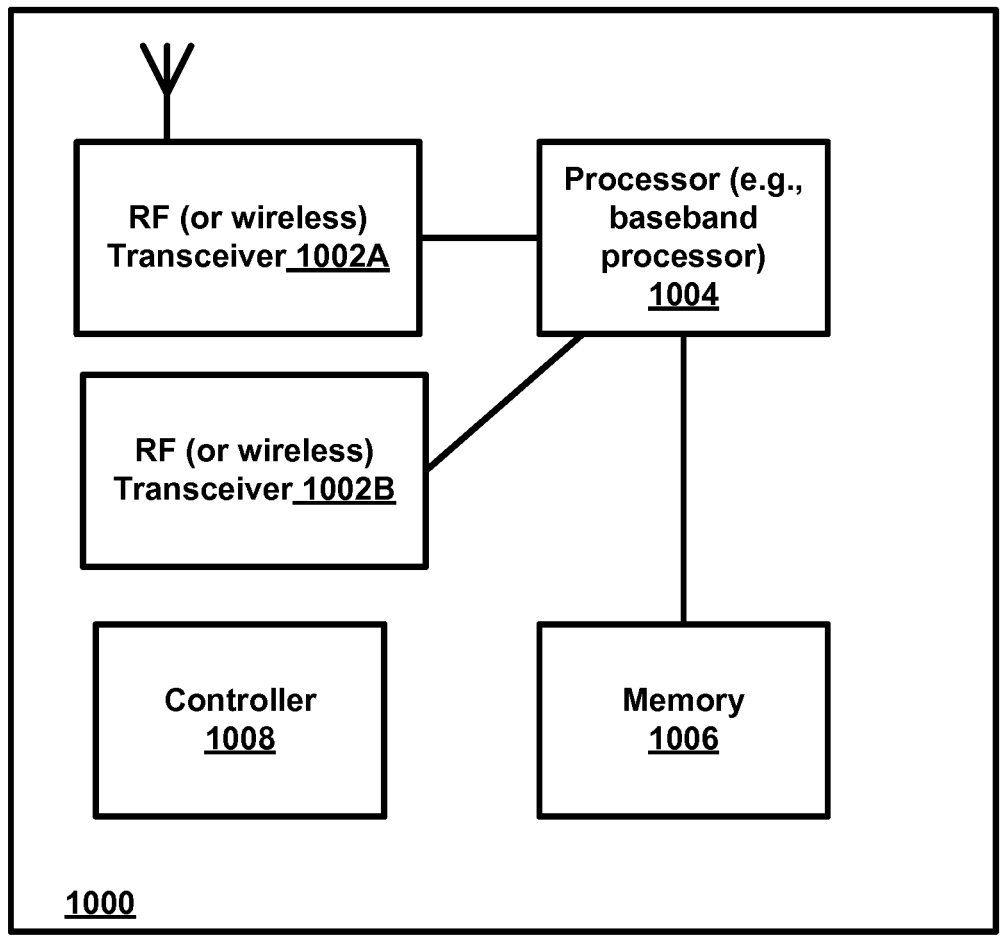
FIG. 6 is a block diagram of a node or wireless station (e.g., base station/access point or mobile station/user device) according to an example implementation.

FIG. 6 is a block diagram of a wireless station (e.g., AP, BS, eNB, UE or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 6, a controller (or processor) 1008 may execute software and instructions, and may provide overall control for the station 1000, and may provide control for other systems not shown in FIG. 6, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    receiving, by a user device from a base station in a wireless network, downlink control information including at least an uplink grant that indicates at least a size of uplink resources allocated to the user device and one or more sub-band precoder indications for one or more corresponding sub-bands within the uplink resources allocated to the user device, wherein each of the one or more sub-bands comprises one or more uplink resources;
    determining, by the user device, a set of uplink sub-band allocation parameters, including at least:
        a total number of bits in the downlink control information for the one or more sub-band precoder indications, wherein the total number of bits for the one or more sub-band precoder indications is the same for a plurality of different sizes of uplink resources allocated to the user device;
    decoding, by the user device, the downlink control information and extracting, based on at least a portion of the set of uplink sub-band allocation parameters, a number of sub-bands and each of the one or more sub-band precoder indications; and
    precoding, by the user device, based on the one or more sub-band precoder indications, data for transmission via the one or more sub-bands.

2. The method of claim 1 wherein the determining further comprises determining at least one of the following:
    a number of bits per each of the sub-band precoder indications; and
    a sub-band size for each of the one or more sub-bands;
    wherein at least one of the number of bits per sub-band precoder indication and the sub-band size for each of the one or more sub-bands changes or is a different value based on different sizes of uplink resources allocated to the user device.

3. The method of claim 1 wherein the determining further comprises determining:
    a number of bits per each of the sub-band precoder indications;
    wherein the number of bits per sub-band precoder indication changes or is a different value based on different sizes of uplink resources allocated to the user device.

4. The method of claim 3 wherein:
    the sub-band size for each of the one or more sub-bands is a same value for different sizes of uplink resources allocated to the user device; and
    a number of sub-bands is different for a plurality of different sizes of uplink resources allocated to the user device.

5. The method of any of claim 1 wherein the determining further comprises determining the following:
    a sub-band size for each of the one or more sub-bands;
    wherein the sub-band size for each of the one or more sub-bands changes or is a different value based on different sizes of uplink resources allocated to the user device.

6. The method of claim 5 wherein the sub-band size for at least one of the one or more sub-bands within the uplink resources allocated to the user device is different from the sub-band size for the other sub-bands within the uplink resources allocated to the user device.

7. The method of claim 5 wherein:
    a number of sub-bands is a same value for different sizes of uplink resources allocated to the user device; and
    the number of bits per each of the sub-band precoder indications is a same value for different sizes of uplink resources allocated to the user device.

8. The method of claim 1 wherein the decoding comprises:
    decoding the downlink control information and extracting, based on at least a portion of the set of uplink sub-band allocation parameters, a number of sub-bands, a number of bits per each of the sub-band precoder indications and each of the one or more sub-band precoder indications.

9. The method of claim 1 and further comprising:
    transmitting, by the user device, the pre-coded data via the one or more sub-bands of the uplink resources allocated to the user device.

10. The method of claim 1 wherein the determining a set of uplink sub-band allocation parameters comprises:
    determining, by the user device, a set of uplink sub-band allocation parameters based on at least one of the following:
        a table lookup based on the size of uplink resources allocated to the user device; and
        a formula that indicates a set of uplink sub-band allocation parameters depending on the size of uplink resources allocated to the user device.

11. The method of claim 1 wherein the determining a set of uplink sub-band allocation parameters comprises:

determining the total number of bits in the downlink control information for the one or more sub-band precoder indications based on one of the following:

the user device being previously configured with the total number of bits in the downlink control information for the one or more sub-band precoder indications; and receiving, by the user device, a control message from the base station indicating the total number of bits in the downlink control information for the one or more sub-band precoder indications.

12. The method of claim 1 wherein the determining a set of uplink sub-band allocation parameters comprises determining a number of sub-bands based on one of the following:

the user device being previously configured with the number of sub-bands; and receiving, by the user device, a control message from the base station indicating the number of sub-bands.

13. The method of claim 1 wherein the determining the sub-band size for each of the one or more sub-bands comprises one of the following:

determining, by the user device, the same sub-band size for each of the one or more sub-bands based on a formula depending on the number of sub-bands; and determining, by the user device, the sub-band size for each of the one or more sub- bands based on at least:

determining, by the user device, the sub-band size for at least one of the first and last sub-bands within the uplink resources allocated to the user device based on previous configuration;

determining, by the user device, the same sub-band size for each of the remaining sub-bands within the uplink resources allocated to the user device based on a formula depending on the number of sub-bands.

14. The method of claim 1 wherein:

the sub-band size for each of the one or more sub-bands is different for a plurality of different sizes of uplink resources allocated to the user device;

a number of sub-bands is a same value for different sizes of uplink resources allocated to the user device; and the number of bits per each of the sub-band precoder indications is a same value for different sizes of uplink resources allocated to the user device.

15. The method of claim 1 wherein:

the sub-band size for each of the one or more sub-bands is a same value for different sizes of uplink resources allocated to the user device;

a number of sub-bands is different for a plurality of different sizes of uplink resources allocated to the user device; and the number of bits per each of the sub-band precoder indications is different for a plurality of different sizes of uplink resources allocated to the user device.

16. The method of claim 1 wherein:

the sub-band size for each of the one or more sub-bands is different for a plurality of different sizes of uplink resources allocated to the user device;

a number of sub-bands is different for a plurality of different sizes of uplink resources allocated to the user device; and the number of bits per each of the sub-band precoder indications is different for a plurality of different sizes of uplink resources allocated to the user device.

17. The method of claim 1 wherein the downlink control information is provided to the user device via a single-step downlink configuration.

18. An apparatus comprising at least one processor and at least one memory including computer instructions that, when executed by the at least one processor, cause the apparatus to perform the method of claim 1.

* * * * *

UNITED STATES PATENT AND TRADEMARK OFFICE
CERTIFICATE OF CORRECTION

PATENT NO. : 11,528,064 B2
APPLICATION NO. : 16/616900
DATED : December 13, 2022
INVENTOR(S) : Jun Tan et al.

It is certified that error appears in the above-identified patent and that said Letters Patent is hereby corrected as shown below:

In the Claims

In Column 28, Line 26, Claim 5, delete "any of" before "claim 1".

Signed and Sealed this
Twentieth Day of June, 2023

Katherine Kelly Vidal
*Director of the United States Patent and Trademark Office*